Sept. 22, 1936.  A. R. NELSON  2,055,042
ELECTRIC CLOCK
Filed Oct. 24, 1930
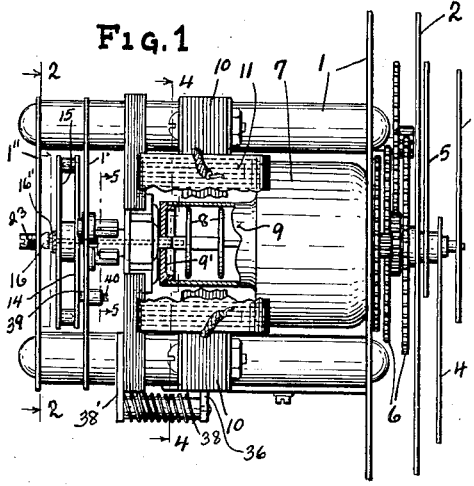
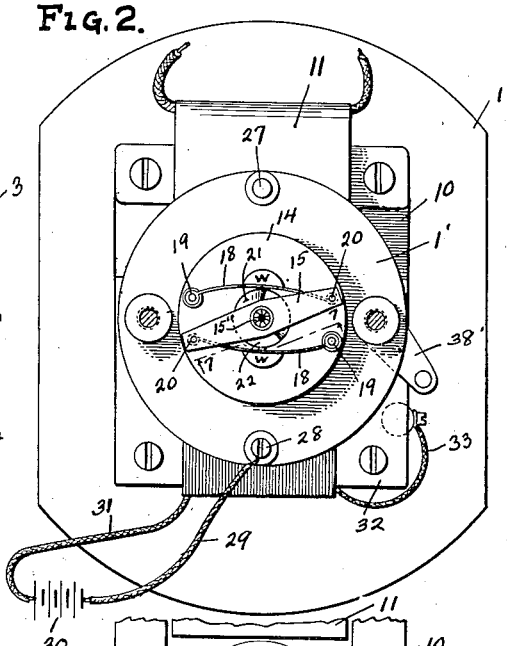
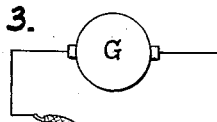
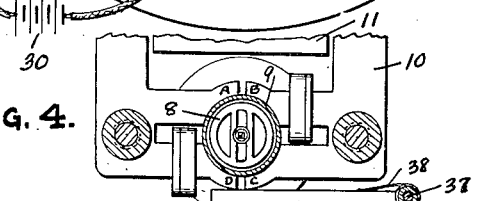
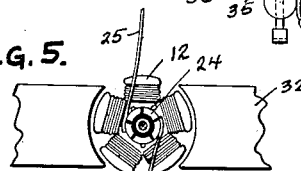
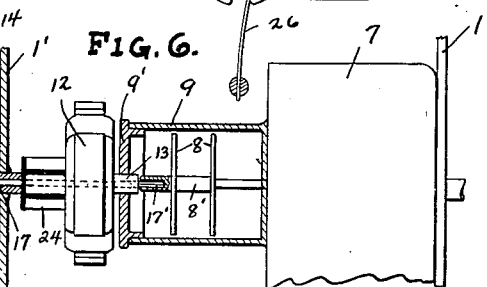
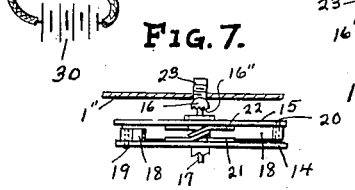
INVENTOR.
ANTON R. NELSON
BY Miller Boyken & Bried
ATTORNEYS.

Patented Sept. 22, 1936

2,055,042

UNITED STATES PATENT OFFICE 2,055,042

ELECTRIC CLOCK

Anton R. Nelson, Burlingame, Calif., assignor of one-half to Thomas Bonthron, San Francisco, Calif.

Application October 24, 1930, Serial No. 490,922

7 Claims. (Cl. 58—26)

This invention relates to electric clocks, particularly such as are driven by a synchronous motor from the alternating house current, known generally as synchronous or "Telechron" clocks, and the objects of the invention are to provide means whereby upon temporary failure or interruption of the house current for any reason, the clock will automatically be kept running from a second source of energy until re-establishment of the first or primary source, also where the secondary source of energy is cut out and held entirely separated from the mechanism both electrically and mechanically, through and by the energy of the primary source of energy, except at such times as the primary source of energy fails.

In the drawing accompanying this application Fig. 1 is a plan view of the clock assemblage of a "Telechron" clock removed from its case and with portion of the magnet and winding broken away to reveal the main driving motor rotor as well as the auxiliary motor constituting one of the features of my improvements.

Fig. 2 is a rear elevation of Fig. 1 as seen from the line 2—2 of Fig. 1.

Fig. 3 is a side elevation of the mechanism of Fig. 1 with the hands, dial and the gears which operate the hands omitted.

Fig. 4 is a cross section of a portion of the mechanism as seen from the line 4—4 of Fig. 1.

Fig. 5 is a cross section of a portion of the mechanism as seen from the line 5—5 of Fig. 1.

Fig. 6 is an enlarged longitudinal central section of Fig. 1 showing the main motor armature housing in section, the auxiliary motor armature in full, and the clutch elements whereby the auxiliary motor picks up the main motor shaft.

Fig. 7 is a bottom view of a portion of Fig. 2 as seen from the line 7—7 thereof showing certain features of the clutch and governor.

Briefly described, the invention comprises the combination with an electric clock of the "Telechron" type driven from the house current by a main motor, of an auxiliary motor operated from an independent source of electricity such as a battery, and the circuit of the auxiliary motor held open by a magnetic switch actuated by the energy to the main motor so that when the main current fails the switch will close and start the auxiliary motor and connects a clutch carried by the auxiliary motor with the shaft of the main motor and thus continue the running of the clock which would otherwise have stopped on account of cessation of the main or house current supply.

In the drawing the main elements of the electric clock are the frame members 1, dial 2, hands 3, 4, 5, gearing for the hands 6, a casing 7 containing suitable reduction gearing (not shown) for reducing the high speed of the rotor 8 of the main driving motor so that it will run the gearing 6 at the proper speeds.

Rotor 8 is enclosed in a brass tube 9 embraced by the field magnets 10 energized by a coil 11 from a source of alternating current G which is usually the 60-cycle house current as supplied from the public service corporations. The poles A, B, C, D of the magnet 10 are arranged to produce a rotating field in the well-known manner to cause synchronous rotation of the rotor 8 so that as long as the current is maintained the clock will run.

All the above is well-known construction of electric clocks and with which my improvements form a combination.

In the prior construction brass tube 9 enclosing the rotor 8 is integrally closed at the outer end, but in the improved construction I have provided a separate head 9' on the tube (see Fig. 6) to form one bearing support for the hollow shaft 13 of the armature 12 of the auxiliary motor, the other end of the hollow shaft being rotatably supported in a fixed frame plate 1' and carrying at its outer end a pair of clutch or governor members 14, 15, the former being a disk provided with a hub 14' which screws upon the outer threaded end of the hollow armature shaft, and the latter being an arm provided with a hollow hub 15' which slides freely over the hub of disk 14 and has its extreme outer end formed with clutch teeth 15'' adapted to engage complementary teeth 16'' formed on a boss or clutch hub 16 in turn formed on or securely attached to a small shaft 17 which extends freely through the bore of hollow shaft 13 and into a hole in the outer end of shaft 8' of rotor 8, the inner end 17' of shaft 17 and the hole in shaft 8' being square or otherwise formed for relative sliding but non-rotative contact.

Disk 14 and arm 15 are connected for simultaneous revolution by means of two flat springs 18 provided with bosses at their ends respectively slidable over pins 19, 20 respectively attached to members 14 and 15 in the manner shown best in Fig. 2 and the springs carry inertia weights W so that in rotation of the members 14 and 15 the weights will be thrown outwardly to thereby cause relative rotation between the disk and arm and axial separation of these two members by reason of complementarily formed spiral spreader plates 21, 22 respectively secured to the confronting faces of members 14 and 15 as best shown in Fig. 7 where the action of the spreader plates, which function like a pair of spiral jaw clutches, will be readily understood.

Beyond the outer end of hub 16 is a fixed frame plate 1'' threadedly extending through which is a screw 23 adapted to bear against the end of clutch hub 16 so as to adjust it in relation to teeth 15'' on hub 15' and which screw also serves to regulate the speed of the auxiliary motor as will be later described.

The auxiliary motor is a D. C. motor provided with a commutator 24 suitably insulated from its shaft and provided with a pair of spring brushes 25, 26 the former being supported on a stud 27 secured directly to fixed frame plate 1', while the latter is carried by a pin 28 insulatingly mounted on the plate and directly connected with one of the terminal wires 29 of the battery 30 while the other terminal 31 extends first around the horseshoe magnet 32 of the auxiliary motor to form the field winding and thence at 33 to an insulated standard 34, thence through switch contacts 35 to the frame to find its way through brush 25 to complete the circuit through the commutator 24, rotor 12 and other brush.

Switch contacts 35 are, however, kept separated when current flows to the main motor, and this is effected by mounting one of the contacts on an iron or steel bar 36 pivoted at 37 to a bracket 38' secured to the frame and arranged to be held up by attraction of main magnet C, D, but always ready to fall by gravity when the magnetism in magnet C, D, fails or the voltage in the alternating current to the main motor falls to a predetermined point below normal where the strength of the magnets is insufficient to retain the bar 36 in engagement therewith and thus close the contact and start revolution of the auxiliary motor. A flexible positive electrical connection from bar 36 through pivot 37 is insured by a small copper wire 38 soldered at its ends to bar 36 and bracket 38'.

In normal position with the auxiliary motor inactive, the armature 12 is slightly displaced inward or offset on its axis to the right in Fig. 1 relative to the magnetic center of the field magnet 32, and with teeth 15'' disengaged from teeth 16'' so that the armature upon starting will, in centering itself, move the teeth 15'' into engagement with the clutch teeth 16'' thereby connecting the auxiliary motor to drive the clock through shaft 17 and shaft 8' of the main rotor.

In operation, should the main motor stop on account of interruption of power supply the lever 36 will drop and close contacts 35 to complete the battery circuit through the auxiliary motor so that instantly the auxiliary motor rotates, its armature is pulled over into the magnetic center of the field magnet 32 thus engaging dental clutch 15'' and 16'' thereby re-establishing rotation of the main rotor 8 on the shaft 8' which connects with reduction gearing in casing 7, so that the clock keeps right on notwithstanding interruptions to the main current supply.

Members 14 and 15 carrying spreader plates 21, 22, springs 18 and weights W and clutch teeth 15'' move axially and rotate with the movement of the armature since they are carried by the armature shaft, and as the auxiliary motor gains speed the centrifugal action of the weights turn members 14 and 15 relative to each other through the arrangement of spreader plates 21 and 22 and tend to force member 15 carrying clutch teeth 15'' outward but as this movement is limited by screw 23 which holds hub 16 and teeth 16'' against further movement outward by teeth 15'' after once having been engaged through the centering effect of the armature as described, the inner plate or disk 14 is forced inward toward plate 1', at the time forcing the armature slightly out of its magnetic center as at starting position.

The auxiliary motor is designed to rotate in same direction and at a slightly higher speed than the main driving rotor 8 so that upon initial taking over of the load by the auxiliary motor, due to its higher speed, the otherwise slight loss of a fraction of a second by the clock will be compensated for.

However, in order to quickly drop and control the speed of the auxiliary motor, I provide a small felt pad 39 at the end of a screw 40 passing through plate 1' so as to impinge against the rear of disk 14 at a point in the path of its inward movement (due to spreading action of plates 21, 22) where it will brake or govern the rotation of the auxiliary motor and slow it down to exactly the same speed as the normal speed of the main driving rotor.

Any further adjustment that may be necessary to regulate the speed of the auxiliary motor through the action of the pad 39 is easily obtained by turning screw 23 which forces the whole governor assemblage over toward pad 39.

As soon as the current is re-established in the main motor circuit, lever 36 is lifted by the magnetism of poles C, D, the auxiliary motor circuit is broken at 35, the centrifugally controlled member 15 releases the clutch through slowing down of the auxiliary motor and the main motor again takes up the load and clutch teeth 15'', 16'' being in form of a spiral clutch, the re-energization of the main motor field aids in their release if not sufficiently separated.

The only members of the auxiliary mechanism in constant rotation are the small clutch shaft 17 and clutch member 16.

Since the amount of electrical energy used to run the auxiliary motor is small, a very small dry battery tucked within the clock case will suffice to insure the operation of the auxiliary motor for a year or more at least with the ordinary interruptions to the house current.

Having thus described my invention it will be evident to any clock expert that considerable variations in precise detail may be made without departing from the spirit of the invention as embraced within the scope of my appended claims.

I claim:—

1. In a clock operated by a main electric motor, an auxiliary electric motor arranged adjacent said main motor, a clutch for connecting the rotor shafts of both motors, means operated by centering action of the auxiliary motor armature in its field arranged for engaging said clutch, independent electric circuits for the motors, and means maintaining the circuit of the auxiliary motor broken during the operation of the main motor only.

2. In a clock, a synchronous electric motor in an alternating current circuit connected to drive the clock, an auxiliary motor, means automatically actuating said auxiliary motor upon cessation of the current to the synchronous motor, means operated by the movement of the auxiliary motor for connecting the auxiliary motor and synchronous motor for driving the synchronous motor and means controlling the speed of the auxiliary motor.

3. In a clock operated by a synchronous electric motor in an alternating current circuit, an auxiliary motor, means automatically actuating said auxiliary motor upon cessation of the current to the synchronous motor, a centrifugal governor connected to the auxiliary motor for controlling the speed of the auxiliary motor, means operated by movement of the auxiliary motor for connecting the auxiliary motor with the synchronous motor for driving the synchronous motor.

4. In a clock provided with a synchronous electric driving motor in an alternating current circuit, a second motor provided with an independent source of power, said second motor being normally inoperative to drive the clock, means for connecting the second motor and the synchronous motor, means automatically actuating the second motor to rotate the synchronous motor and to drive the clock upon a predetermined sub-normal variation in the voltage of the alternating current actuating the synchronous motor, said second motor being adapted to operate the synchronous motor and clock at a higher rate of speed than the normal speed of the synchronous motor upon said predetermined sub-normal variation in the voltage of the alternating current, and means actuated by the source of power of the second motor for reducing the normal speed of the second motor whereby the speed of rotation of the synchronous motor will be maintained at substantially its normal rate during the sub-normal variation in the voltage of the alternating current circuit.

5. In a clock, the combination comprising a time indicating means, a synchronous electric motor in an alternating current circuit operatively connected to said time indicating means for actuating the time indicating means, an auxiliary motor automatically operative upon cessation of current to the synchronous motor for driving the synchronous motor during an interruption in current to the synchronous motor, a centrifugal governor connected to the auxiliary motor arranged and adapted to control the speed of the auxiliary motor when the latter is driving the synchronous motor for driving the synchronous motor at its normal synchronous speed.

6. In a clock, the combination comprising a time indicating means, a synchronous electric motor in an alternating current circuit, said synchronous electric motor being operatively connected to said time indicating means for actuating the time indicating means, an auxiliary motor arranged and adapted to automatically drive the synchronous motor at a higher rate of speed than the normal speed of the synchronous motor upon and during an interruption in current to the synchronous motor, a centrifugal governor operatively connected to the auxiliary motor arranged and adapted to modify the speed of the auxiliary motor during an interruption in current to the synchronous motor for driving the synchronous motor at substantially the normal rate of speed of the synchronous motor.

7. In a clock, the combination comprising a time indicating means, a synchronous electric motor in an alternating current circuit, an auxiliary motor, a centrifugal governor operatively connected to said auxiliary motor for controlling its rate of speed, means operatively connecting the synchronous motor for actuating the time indicating means when current is supplied to the synchronous motor, means automatically operative upon cessation of current to the synchronous motor for driving the synchronous motor by the auxiliary motor whereby the centrifugal governor will control the actuation of the synchronous motor and time indicating means as to their rate of speed during an interruption of current to the synchronous motor.

ANTON R. NELSON.